July 14, 1931. J. BING 1,814,891
POWER TRANSMISSION DEVICE FOR PRESSES AND THE LIKE
Filed Oct. 29, 1928
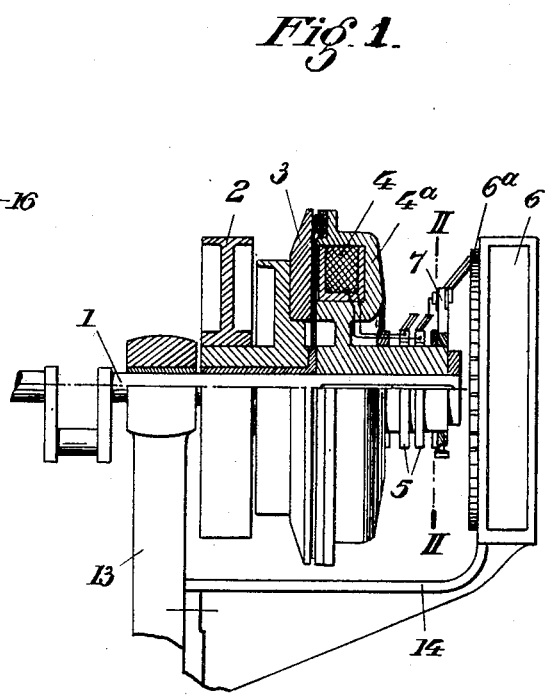
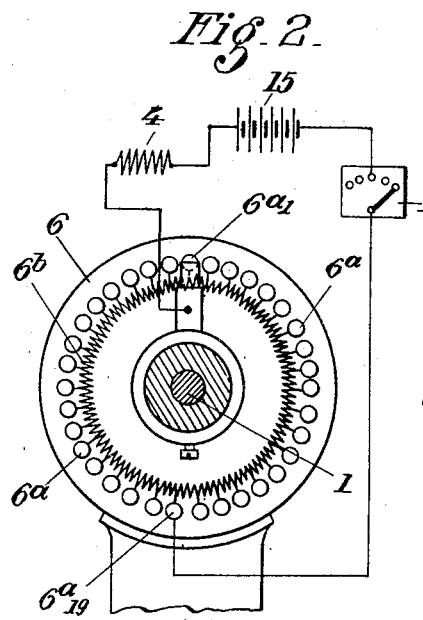
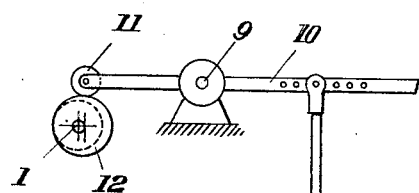
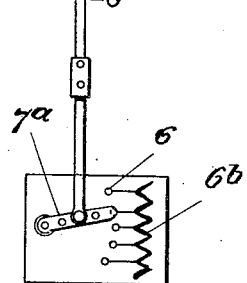
Inventor:
Julius Bing
By: Marks & Clerk
Attys Patented July 14, 1931

1,814,891

UNITED STATES PATENT OFFICE

JULIUS BING, OF EISENACH, GERMANY, ASSIGNOR TO THE FIRM MAGNET-WERK G. M. B. H. EISENACH SPEZIALFABRIK FUR ELEKTROMAGNET-APPARATE, OF EISENACH, THURINGIA, GERMANY

POWER TRANSMISSION DEVICE FOR PRESSES AND THE LIKE

Application filed October 29, 1928, Serial No. 315,888, and in Germany March 7, 1927.

My invention relates to a power transmission device for presses and other machinery and apparatus with working conditions similar to those of presses. Presses and especially pressing machinery for drawing and punching purposes are often subjected to overload arising from a heterogeneous material to be worked or from inadvertence of the machinist as for instance from a wrong adjustment of the stroke, and through the said overload often breakings and other disturbances occur, the avoidance of which is the object of the present invention. It is known to protect machine tools and especially presses against overload by intercalating electromagnetic clutches into the drive and by adjusting in the said clutches the maximum turning moment to be transmitted, the said adjustment being preferably effected by means of a variable series resistance. In presses for drawing and punching purposes the stresses are continuously varying during each stroke.

The object of my invention is to accommodate the power transmission to the said or similar conditions, and for this purpose I provide a corresponding regulating device in connection with an electromagnetically actuated clutch transmitting the driving power to the tool of the machine, the said regulating device effecting a variation of the maximum turning moment to be transmitted, and the said variation being in dependency of the variation of the location of the tool within a working cycle.

An embodiment of my invention accommodated to an eccentric or crank press is illustrated in the accompanying drawings.

Fig. 1 is a side elevation and a vertical axial section of a clutch fitted out with the new regulating device.

Fig. 2 is a section according to the line II—II of the Fig. 1 and a diagram of the connections of the exciting circuit.

Fig. 3 is a schematic illustration of a modification of the regulating device.

1 is the crank shaft of a press which is not illustrated in the drawings. Rotatably mounted on said crank shaft is the armature 3 of an electromagnetically actuated friction clutch of any construction, the said armature being adapted to be driven by means of a pulley or a fly wheel 2. The magnet body $4^a$ containing the exciting coil 4 is fast on the shaft 1. The current is fed to the exciting coil by means of two slip rings 5, 5.

In the circuit of the said coil a rheostat 6 is included which is provided with contacts $6a$ forming a circular row concentric to the shaft 1. The rheostat is adjacent the free end of the shaft 1 and is supported by a bracket 14 which forms a projection of the bearing pedestal 13. The contacts $6^a$ are in electrical connection with the several sections of a correspondingly subdivided resistance coil $6^b$.

Over the contacts a contact brush 7 slips which is fixed on the shaft and adapted to be adjusted relatively to the shaft in circumferential direction.

In the circuit connection according to Fig. 2 the source of current is connected with one end of the exciting coil 4 and with the contact piece $6a_{19}$, and the contact brush 7 is connected with the other end of the coil 4. Whenever the location of the brush 7 corresponds with that of the crank of the press, the two sections of the resistance coil between the contacts $6a_1$ and $6a_{19}$ are connected in parallel within the circuit of the exciting coil, so that the exciting current and correspondingly the attractive force of the clutch has its smallest value in an upper location of the brush. When the crank of the press and the brush 7 approach the lower dead point the resistance in the exciting circuit is decreased and the attractive force of the clutch and the turning moment correspondingly increased having its maximum value when the brush 7 reaches the contact $6a_{19}$, and the crank has passed its lower dead point. Thereupon the turning moment is reduced to its minimum value.

By circumferentially adjusting the brush on the shaft, that is by an angular adjustment of the brush relative to the crank, the phase of the variation in the turning moment of the clutch is altered relatively to the movement of the crank. In this way the variation in the turning moment may be accommodated to different working conditions of the press which is driven through the intermediary of said clutch. The same accommodation may be effected by a corresponding adjustment and subdivision of the resistance $6^b$. For the rough regulation a resistance 16 may be connected in series with the rheostat 6. According to my invention either the contact arm or the rheostat may be arranged to be circumferentially adjusted. In some cases preferably both of the said parts may be adjustable.

The periodic variation in the actuating pressure of the clutch may also be effected by the device which is schematically illustrated in Fig. 3. Here $7^a$ is the contact arm through which the exciting current of the clutch is altered by switching in and switching off the several sections of the resistance coil $6^b$ of the rheostat 6. The said contact arm is not arranged on the shaft 1 but is mounted to swing on the casing of the rheostat. Through the intermediary of a rod 8 the contact arm is connected with a two-armed lever 10 which is mounted at 9. The length of the said connecting rod is adjustable. The lever 10 carries a roller 11 which is in contact with a cam 12 on the shaft 1 of the press. The effective length of the lever arm may be adjusted by displacing the point at which the rod 8 is articulated to the lever 10. With this arrangement the periodic variation of the maximum turning moment to be transmitted is already effected during half a stroke of the press.

The device according to the invention is not only to be used in presses and the like but in all machinery in which a variable adjustment of the maximum turning moment is wanted.

I claim:

1. A power transmission device for machines with a rotary working shaft, comprising: an electromagnetic friction clutch having an exciting circuit, a resistance coil in the said circuit, the said resistance coil consisting of a plurality of sections, a series of contacts being electrically connected with said sections, and contacting means in the said circuit, said contacting means being adapted to be moved in dependence of said shaft and to slip on said series of contacts.

2. A power transmission device for machines with a rotary working shaft, comprising: an electromagnetic friction clutch having an exciting circuit, a resistance coil in the said circuit, the said resistance coil consisting of a plurality of sections, a series of contacts being electrically connected with said sections, and a contact arm being connected with said shaft and adapted to be rotated with it, said contact arm being circumferentially adjustable relatively to said shaft and adapted to electrically connect a smaller or larger number of said contacts with the one end of said circuit.

3. A device for the protection of eccentric or crank presses against breaking, comprising an electromagnetic friction clutch intercalated between the working shaft of the press and its drive, a resistance being subdivided into a plurality of sections, the said resistance being at least partially in series with the exciting coil of said electromagnetic clutch, a circular row of contact pieces electrically connected with said sections, a contact arm adjustably mounted on said working shaft in a circumferential direction and adapted to slip on said row of contacts, and means for electrically connecting said contact arm with said exciting coil.

4. A power transmission device for machines with a rotary working shaft, comprising: an electromagnetically actuated friction clutch being mounted on said shaft and having an exciting circuit, a variable resistance in the said circuit, and regulating means for altering the resistance in dependence on the angular position of said shaft.

5. A power transmission device for periodically working machines, comprising a rotary working shaft, a friction clutch mounted on said shaft, automatic means for periodically altering the maximum torque transmittable by said clutch in accordance with the working phase of said machine, and means for arbitrarily altering the phase variation of the torque relatively to the working phase of the machine.

In testimony whereof I affix my signature.

JULIUS BING.